United States Patent [19]

Takahashi et al.

[11] Patent Number: 5,498,660
[45] Date of Patent: Mar. 12, 1996

[54] SILICONE RUBBER COMPOSITIONS AND METHOD FOR MAKING

[75] Inventors: Masaharu Takahashi; Manabu Narumi, both of Usui, Japan

[73] Assignee: Shin-Etsu Chemical Co., Ltd., Tokyo, Japan

[21] Appl. No.: 360,094

[22] Filed: Dec. 20, 1994

[30] Foreign Application Priority Data

Dec. 21, 1993 [JP] Japan .................................. 5-345208

[51] Int. Cl.⁶ .................................................. C08K 5/04
[52] U.S. Cl. .............................................. 524/730; 528/15
[58] Field of Search .............................. 524/730; 528/15

[56] References Cited

U.S. PATENT DOCUMENTS 4,670,530  6/1987  Beck ........................................... 528/15
5,276,086  1/1994  Arai et al. ................................ 524/730

Primary Examiner—Melvyn I. Marquis
Attorney, Agent, or Firm—Millen, White, Zelano & Branigan

[57] ABSTRACT

To a silicone rubber composition including (A) a diorganopolysiloxane having an aliphatic unsaturated hydrocarbon group, (B) an organohydrogenpolysiloxane having at least two SiH groups in a molecule, and (C) a platinum catalyst, is added (D) an organic silicon compound of the following general formula (2):

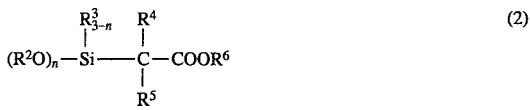

wherein $R^2$, $R^5$, and $R^6$ are independently selected from monovalent hydrocarbon groups free of an aliphatic unsaturated bond, $R^3$ is a monovalent hydrocarbon group, $R^4$ is hydrogen or methyl, and n is an integer of 0 to 3. The composition has a long pot life after addition of curing components (B) and (C) and is extrusion moldable into bubble-free transparent parts. The composition is prepared by mixing component (A) with components (B) and (C) while adding component (D) thereto.

5 Claims, No Drawings

SILICONE RUBBER COMPOSITIONS AND METHOD FOR MAKING

BACKGROUND OF THE INVENTION

1. Field of the Invention

This invention relates to an addition type silicone rubber composition capable of forming bubble-free molded parts and a method for preparing the same.

2. Prior Art

Silicone rubber is often used as medical parts because of heat, low-temperature and weathering resistance and because it can be molded into transparent parts and is biologically compatible. Silicone rubber of the addition type is generally used in the medical field. It is a common practice to add vulcanization retarders or control agents such as benzotriazole, acetylene alcohol derivatives and triphenyl phosphite to addition type silicone rubber compositions since curing reaction can take place at room temperature simply by mixing crosslinking agents and catalysts with the compositions.

However, when the control agents are added to addition type silicone rubber compositions such that a sufficient pot life may be available in extrusion molding the compositions and curing them by hot air vulcanization (HAV), most extrusion molded parts contain bubbles. Such bubbling is avoided by several countermeasures of increasing the amount of catalyst, reducing the amount of control agent, and increasing the plasticity of compound. These countermeasures, however, are accompanied with disadvantages of a shortened pot life, significantly disturbed extrusion, inefficient working, and poor molding appearance.

SUMMARY OF THE INVENTION

An object of the present invention is to provide a silicone rubber composition which can be molded into bubble-free parts even when the composition has low plasticity or a long pot life. Another object is to provide a method for preparing the composition.

We have found that when a silicone rubber composition comprising (A) 100 parts by weight of a diorganopolysiloxane of the following average compositional formula (1):

$$R_a^1 SiO_{(4-a)/2} \quad (1)$$

wherein $R^1$ is a substituted or unsubstituted monovalent hydrocarbon group, 0.01 to 15 mol % of the $R^1$ groups being an aliphatic unsaturated hydrocarbon group, and letter a is a positive number in the range of 1.95 to 2.05 and optionally (E) 5 to 200 parts by weight of a reinforcing filler is mixed with a curing agent comprising (B) an organohydrogenpolysiloxane having at least two SiH groups in a molecule in such an amount that 0.5 to 10 mol of the SiH group is present per mol of the aliphatic unsaturated hydrocarbon group of component (A) and (C) a catalytic amount of a platinum group metal catalyst, it is effective to add to the composition (D) 0.1 to 20 parts by weight of an organic silicon compound of the following general formula (2):

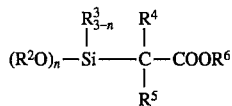

wherein $R^2$, $R^5$, and $R^6$ are independently selected from substituted or unsubstituted monovalent hydrocarbon groups free of an aliphatic unsaturated bond, $R^3$ is a substituted or unsubstituted monovalent hydrocarbon group, $R^4$ is a hydrogen atom or methyl group, and letter n is an integer of 0 to 3. The resulting composition can be molded into bubble-free parts. Bubbles can be eliminated from molded parts not only when the composition is compression molded, but also when the composition is extrusion molded and then hot air vulcanized (HAV). This is also true even when a control agent is added to the composition in such an amount as to permit an acceptable pot life.

Accordingly, the present invention provides a silicone rubber composition comprising components (A) to (D) as defined above. The present invention also provides a method for preparing such a silicone rubber composition by mixing component (A) with components (B) and (C) while adding component (D) thereto.

DETAILED DESCRIPTION OF THE INVENTION

Component (A) is a diorganopolysiloxane of the general compositional formula (1):

$$R_a^1 SiO_{(4-a)/2} \quad (1)$$

wherein $R^1$ is a substituted or unsubstituted monovalent hydrocarbon group. It is necessary that 0.01 to 15 mol %, preferably 0.02 to 5 mol % of the $R^1$ groups is an aliphatic unsaturated hydrocarbon group. If the content of an aliphatic unsaturated hydrocarbon group is less than 0.01 mol % of the $R^1$ groups, cured products having acceptable tear strength are not obtained. If the same content exceeds 15 mol %, the silicone rubber becomes brittle.

Preferably the aliphatic unsaturated hydrocarbon groups are those having 2 to 8 carbon atoms, for example, vinyl and allyl groups, most preferably a vinyl group. The monovalent hydrocarbon groups other than the aliphatic unsaturated hydrocarbon group are preferably those having 1 to 10 carbon atoms, more preferably those having 1 to 8 carbon atoms, for example, alkyl groups such as methyl and ethyl, halogenated alkyl groups such as trifluoropropyl, aryl groups such as phenyl, halogenated aryl groups, and aralkyl groups such as benzyl.

Letter a is a positive number of from 1.95 to 2.05. With a of less than 1.95, it is difficult to synthesize a stable linear polymer and gelation often occurs. With a of more than 2.05, it is difficult to synthesize a high molecular weight polymer. Component (A) or diorganopolysiloxane should preferably have a degree of polymerization of at least 1,000, especially 2,000 to 10,000.

It will be understood that the organopolysiloxane defined herein can be obtained by any well-known method, typically alkali catalyzed polymerization.

Component (B) is an organohydrogenpolysiloxane having at least two SiH groups in a molecule. Any well-known one may be used herein. The organohydrogenpolysiloxane may be linear, cyclic or branched while the SiH groups may be at the end or an intermediate of the polysiloxane chain. It preferably has a degree of polymerization of 5 to 1,000, especially 10 to 500. It is used in such an amount that there is available 0.5 to 10 mol, especially 1 to 5 mol of SiH group per mol of the aliphatic unsaturated group in component (A) or organopolysiloxane.

Component (C) is a platinum group metal catalyst which is effective for promoting addition reaction between aliphatic unsaturated hydrocarbon (typically alkenyl) groups in the organopolysiloxane (A) and SiH groups in the organohydrogenpolysiloxane (B). It is used in a catalytic amount, preferably 0.1 to 2,000 ppm, more preferably 1 to 1,000 ppm of platinum metal based on the combined amount of components (A) and (B). The platinum group metal catalyst used herein may be selected from well-known ones, for example, the finely divided metallic platinum catalyst described in U.S. Pat. No. 2,970,150, the chloroplatinic acid catalyst described in U.S. Pat. No. 2,823,218, the platinum-hydrocarbon complex compounds described in U.S. Pat. Nos. 3,159,601 and 3,159,662, the chloroplatinic acid-olefin complex compound described in U.S. Pat. No. 3,516,946, and the platinum-vinyl siloxane complex described in U.S. Pat. Nos. 3,775,452 and 3,814,780.

According to the present invention, the silicone rubber composition further includes (D) an organic silicon compound of the following general formula (2).

$$(R^2O)_n-\underset{\underset{R^3_{3-n}}{|}}{Si}-\underset{\underset{R^5}{|}}{\overset{\overset{R^4}{|}}{C}}-COOR^6 \qquad (2)$$

This organic silicon compound is characterized by having a highly reactive Si—C bond. It serves as an anti-foaming agent by capturing water in the filler or compound which otherwise causes molded parts to contain bubbles, eliminating a need for a special catalyst.

In formula (2), $R^2$, $R^5$, and $R^6$, which may be identical or different, are selected from substituted or unsubstituted monovalent hydrocarbon groups free of an aliphatic unsaturated bond, preferably those having 1 to 10 carbon atoms, more preferably those having 1 to 8 carbon atoms, for example, alkyl groups having 1 to 10 carbon atoms, preferably 1 to 8 carbon atoms, such as methyl and ethyl groups.

$R^3$ is a substituted or unsubstituted monovalent hydrocarbon group, preferably those having 1 to 10 carbon atoms, more preferably those having 1 to 8 carbon atoms. Examples include alkyl groups such as methyl, ethyl, propyl, butyl, pentyl, hexyl, heptyl, and octyl; cycloalkyl groups such as cyclohexyl; alkenyl groups such as vinyl and propenyl; aryl groups such as phenyl; and substituted ones of these groups wherein some or all of the hydrogen atoms are replaced by halogen atoms such as chlorine. Alkyl groups are preferred.

$R^4$ is a hydrogen atom or methyl group. Letter n is an integer of 0, 1, 2 or 3.

The organic silicon compounds may be prepared by a well-known method as disclosed in JP-A 93326/1992. Illustrative, non-limiting examples of the organic silicon compound are given below wherein Me is methyl, Et is ethyl, Pr is propyl and Bu is butyl.

(MeO)₃SiCH₂COOMe, (MeO)₃SiCH₂COOEt, (MeO)₃SiCH₂COOPr, (MeO)₃SiCH₂COOn—C₈H₁₇,

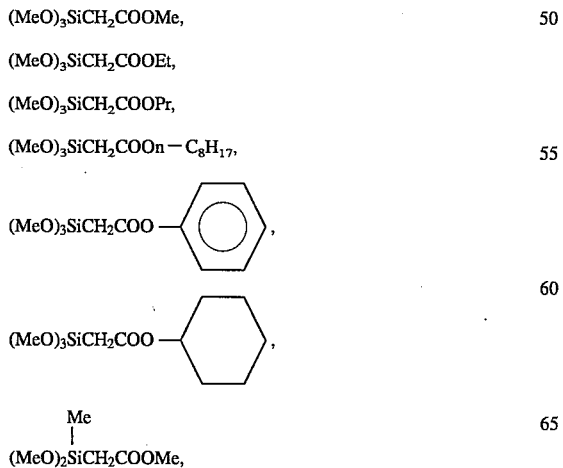

(MeO)₃SiCH₂COO—⟨phenyl⟩, (MeO)₃SiCH₂COO—⟨cyclohexyl⟩,

Me
|
(MeO)₂SiCH₂COOMe,

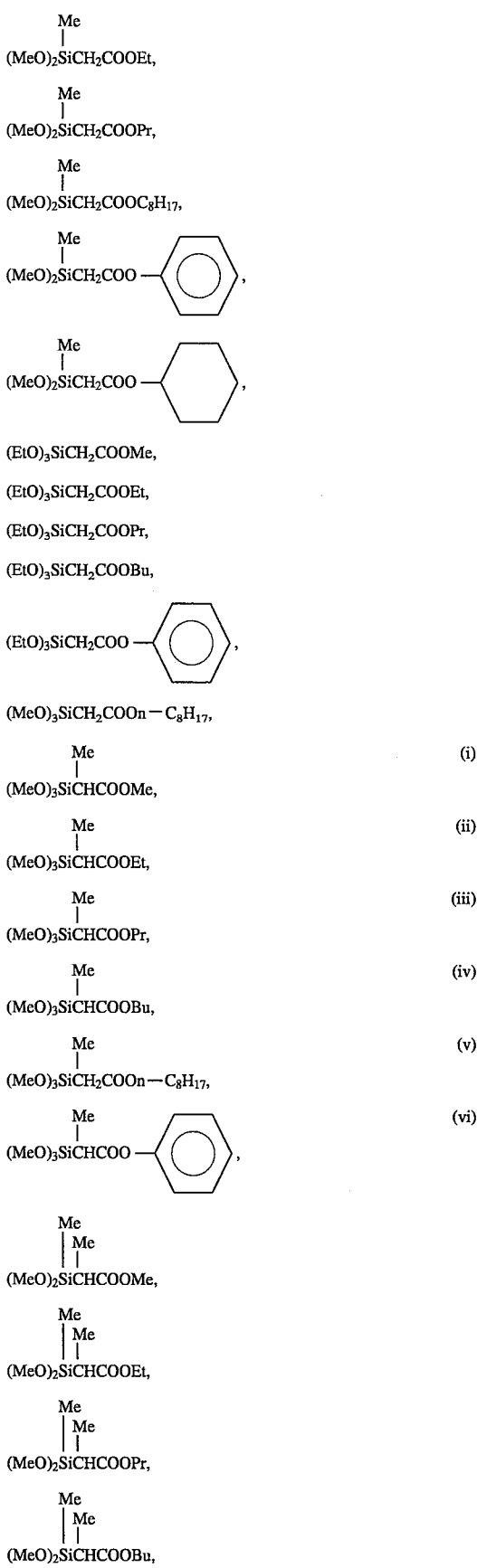

Me
|
(MeO)₂SiCH₂COOEt,

Me
|
(MeO)₂SiCH₂COOPr,

Me
|
(MeO)₂SiCH₂COOC₈H₁₇,

Me
|
(MeO)₂SiCH₂COO—⟨phenyl⟩,

Me
|
(MeO)₂SiCH₂COO—⟨cyclohexyl⟩, (EtO)₃SiCH₂COOMe, (EtO)₃SiCH₂COOEt, (EtO)₃SiCH₂COOPr, (EtO)₃SiCH₂COOBu, (EtO)₃SiCH₂COO—⟨phenyl⟩, (MeO)₃SiCH₂COOn—C₈H₁₇, Me
|
(MeO)₃SiCHCOOMe,   (i)

Me
|
(MeO)₃SiCHCOOEt,   (ii)

Me
|
(MeO)₃SiCHCOOPr,   (iii)

Me
|
(MeO)₃SiCHCOOBu,   (iv)

Me
|
(MeO)₃SiCH₂COOn—C₈H₁₇,   (v)

Me
|
(MeO)₃SiCHCOO—⟨phenyl⟩,   (vi)

Me Me
| |
(MeO)₂SiCHCOOMe,

Me Me
| |
(MeO)₂SiCHCOOEt,

Me Me
| |
(MeO)₂SiCHCOOPr,

Me Me
| |
(MeO)₂SiCHCOOBu,

Me
|  Me
|  |
(MeO)₂SiCHCOOC₈H₁₇,

Me
|  Me
|  |
(MeO)₂SiCHCOO—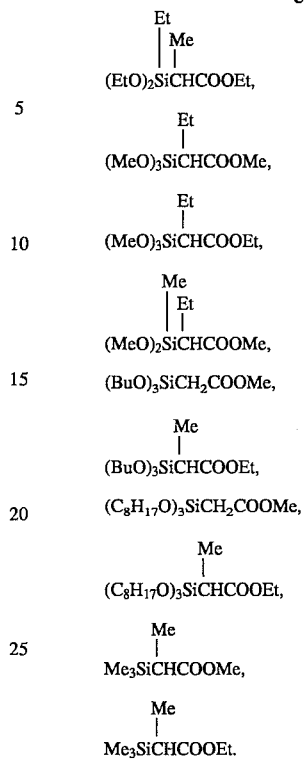

(MeO)₂SiCHCOOMe, (MeO)₂SiCHCOOEt,

Et
|  Me
|  |
(MeO)₂SiCHCOOMe,

Me
|
(EtO)₃SiCHCOOMe,

Me
|
(EtO)₃SiCHCOOEt,

Me
|
(EtO)₃SiCHCOOPr,

Me
|
(EtO)₃SiCHCOOBu,

Me
|
(EtO)₃SiCHCOOC₈H₁₇,

Me
|
(EtO)₃SiCHCOO—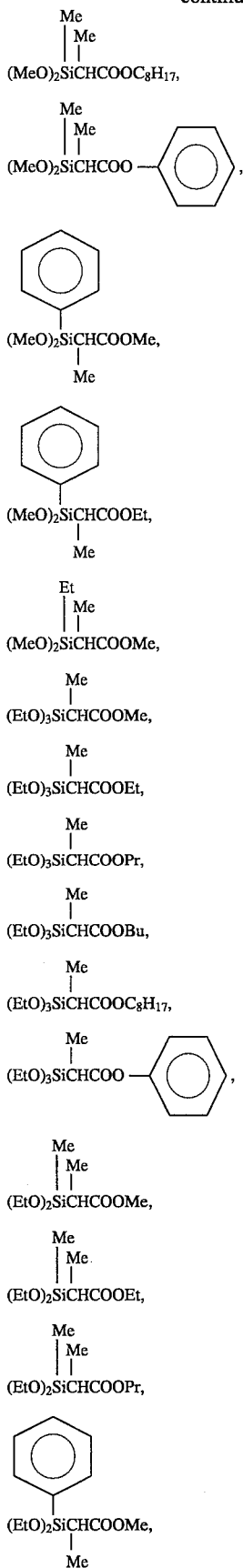,

Me
|  Me
|  |
(EtO)₂SiCHCOOMe,

Me
|  Me
|  |
(EtO)₂SiCHCOOEt,

Me
|  Me
|  |
(EtO)₂SiCHCOOPr, (EtO)₂SiCHCOOMe,
|
Me

Et
|  Me
|  |
(EtO)₂SiCHCOOEt,

Et
|
(MeO)₃SiCHCOOMe,

Et
|
(MeO)₃SiCHCOOEt,

Me
|  Et
|  |
(MeO)₂SiCHCOOMe, (BuO)₃SiCH₂COOMe,

Me
|
(BuO)₃SiCHCOOEt, (C₈H₁₇O)₃SiCH₂COOMe,

Me
|
(C₈H₁₇O)₃SiCHCOOEt,

Me
|
Me₃SiCHCOOMe,

Me
|
Me₃SiCHCOOEt.

Among these illustrative compounds, compounds (i) to (vi) are preferred.

In the practice of the invention, the organic silicon compound of formula (2) is used in an amount of 0.1 to 20 parts, preferably 0.1 to 10 parts by weight per 100 parts by weight of organopolysiloxane (A). Less than 0.1 part of component (D) is too small to achieve the intended purpose whereas more than 20 parts achieves no further improvements and rather invites some disadvantages like tackiness.

In addition to components (A) to (D), the silicone rubber composition of the invention preferably includes a reinforcing filler as component (E). The reinforcing filler is effective for imparting mechanical strength to the composition. Exemplary fillers are fumed silica, precipitated silica, fused silica, ground quartz, diatomaceous earth, aluminum silicate, titanium oxide, zinc oxide, iron oxide, alumina, calcium carbonate, zinc carbonate, and carbon black. For sufficient reinforcement, the filler preferably has a specific surface area of at least 10 m²/g, more preferably at least 100 m²/g as measured by a BET method. The filler is used not only for imparting mechanical strength, but also for imparting electrical conduction and heat transfer. If desired, the inorganic filler may be surface treated with organosilanes, organosilazanes, and silicone oil. Component (E) is preferably used in an amount of 5 to 200 parts, more preferably 10 to 100 parts by weight per 100 parts by weight of organopolysiloxane (A). Less than 5 parts of component (E) would be too small to improve workability or provide reinforcement whereas more than 200 parts of component (E) would detract from workability and mold flow during working and result in silicone rubber having reduced mechanical properties.

It is preferred to add a reaction control agent (F) to the silicone rubber composition of the invention in order that the composition have storage stability at room temperature and an appropriate pot life. Examples of the control agent include methylvinylpolysiloxane, acetylene alcohol derivatives, benzotriazole, organic phosphorus compounds (e.g., triphenyl phosphite), triazine compounds, organic amine compounds, and organic sulfur compounds. The amount of the reaction control agent added is preferably 1 to 100 times, more preferably 1 to 50 times the amount of the platinum catalyst on a molar basis although the amount depends on the control ability of the agent. Usually, the reaction control agent is added in an amount of 0.01 to 5 parts by weight, preferably 0.05 to 1 part by weight per 100 parts by weight of component (A). Less than 0.05 parts by weight would result in insufficient reaction control effect. More than 5 parts by weight would result in slow curing. Even when such a reaction control agent is added to the inventive composition in such an amount as to extend pot life, the addition of component (D) permits the inventive composition to be extrusion molded and hot air vulcanized without foaming.

Any desired additives may be blended in the silicone rubber composition of the invention insofar as the objects of the invention are not impaired. Useful additives include silica modifiers such as processing aids and dispersants, heat resistance enhancers, pigments, blowing agents, and flame retardants. Exemplary dispersants are short-chain diorganopolysiloxanes end blocked with a hydroxyl group and hexaorganodisilazanes though not limited thereto.

The composition of the invention is prepared by heating and mixing component (A), preferably component (E) and optional additives as mentioned above, milling them in a suitable mixer means such as a two-roll mill and Bunbury mixer to form a base compound, and mixing a curing catalyst consisting of components (B) and (C) into the base compound. While the curing catalyst is mixed with the base compound, component (E) is added thereto.

The time taken for milling the components generally ranges from about 15 minutes to about 5 hours depending on the amounts of the components to be blended, the viscosity of the resulting base compound, and the shear rate applied by the mill. For a mixture of a diorganopolysiloxane, reinforcing filler, silica modifier, and the like, heat treatment is generally effected in the range of 100° to 250° C. independent of the type of a mill used. The composition of the invention is prepared by mixing a curing catalyst consisting of components (B) and (C) into the base compound while adding component (D) thereto.

It is to be noted that the reinforcing filler (E) may be treated in the presence of the diorganopolysiloxane (A) or pretreated prior to mixing with the remaining components of the composition.

A conventional blending method as mentioned above is satisfactory for the preparation of the inventive composition. More preferably, the base compound is prepared by premixing an organopolysiloxane containing a methylvinylsiloxane unit, fumed silica, and methylphenylpolysiloxane blocked with a hydroxyl group at each end as a filler modifying agent, using a kneader mixer. A dimethylpolysiloxane blocked with a hydroxyl group at each end as a filler dispersing agent is then added to and mixed with the premix. The mixture is milled at 150° C. for 2 hours.

Finally the thus obtained silicone rubber composition is molded and cured into a molded silicone rubber. For example, the composition is extruded through a die of a silicone rubber molding extruder and then maintained in a vulcanizer set at 60° to 400° C., preferably 250° to 450° C. for 10 seconds to 5 hours, preferably 10 seconds to 10 minutes. In this way, the composition is vulcanized and cured into a molded part of desired shape. If desired it may be post cured by heating at 100° to 250° C. for 0 to 8 hours. The preferred vulcanization process is hot air vulcanization (HAV).

EXAMPLE

Examples of the present invention are given below by way of illustration and not by way of limitation. All parts are by weight.

EXAMPLES 1-3 & COMPARATIVE EXAMPLES 1-5

To an organopolysiloxane mix of 97 parts of methylvinylpolysiloxane consisting of 99.92 mol % of a dimethylsiloxy unit and 0.08 mol % of a methylvinylsiloxy unit, blocked with a dimethylvinylsiloxy unit at a molecular end and having an average degree of polymerization of 8,000 and 3 parts of methylvinylpolysiloxane consisting of 90.00 mol % of a dimethylsiloxy unit and 10.00 mol % of a methylvinylsiloxy unit, blocked with a dimethylvinylsiloxy unit at a molecular end and having an average degree of polymerization of 5,000 were added 40 parts of fumed silica having a specific surface area of 200 m$^2$/g (Aerosil 200, Nippon Aerosil K.K.) and 10.0 parts of dimethylpolysiloxane blocked with a hydroxyl group at each molecular end and having an average degree of polymerization of about 20. Using a kneader mixer, the ingredients were uniformly mixed at 150° C. for 2 hours to form a silicone rubber blend.

To the blend were mixed a curing agent and a control agent, both shown below, and further added octyl α-trimethoxysilylpropionate (designated compound A) in the amount shown in Table 1. The ingredients were uniformly milled by a twin-roll mill. A series of silicone rubber compositions were prepared in this way.

| Curing agent: | |
|---|---|
| Divinyltetramethyldisiloxane solution of platinum-divinyltetramethyldisiloxane complex (platinum content 1%) | 0.1 part |
| Organohydrogenpolysiloxane of the following formula | 1.5 parts |
| 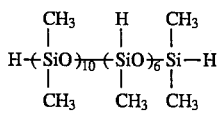 | |
| Control agent: | |
| (a) tri(t-butylperoxy)triazine | 0.2 part |
| (b) ethynylcyclohexanol | 0.1 part |

Each of the compositions was press molded at a temperature of 165° C. and a pressure of 100 kg/cm$^2$ for 10 minutes into a sheet of 2 mm thick and post cured at 200° C. for 4 hours. The cured sheet or specimen was measured for physical properties hardness (Hs), tensile strength (TS), elongation, tear strength (TRA), and compression set.

Separately, each of the uncured compositions was sheeted to a gage of 5 mm, subjected to HAV in a vulcanizer at 400° C. for 30 seconds, and examined for bubbles.

A pot life after mixing of the catalyst was measured at 40° C.

The results are shown in Table 1.

TABLE 1

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Compound A, parts | 1.0 | 3.0 | 1.0 | 0.2 | 8 | 0.0 | 0.05 | 25.0 | 0.0 | 0.0 |
| Control agent | a | a | b | a | a | a | a | a | b | no |
| Hs (JIS-A) | 61 | 59 | 62 | 60 | 56 | 63 | 63 | 54 | 63 | — |
| TS, kgf/cm$^2$ | 98 | 96 | 97 | 97 | 90 | 98 | 97 | 85 | 98 | — |
| Elongation, % | 540 | 590 | 550 | 540 | 490 | 530 | 540 | 680 | 540 | — |
| TRA, kgf/cm$^2$ | 32 | 35 | 33 | 32 | 37 | 33 | 32 | 38 | 32 | — |
| Compression set, % (180° C./22 hr.) | 22 | 25 | 23 | 24 | 27 | 18 | 20 | 35 | 19 | |
| Bubbles (400° C./30 sec.) | no | no | no | no | no | large bubbles | large bubbles | small bubbles | fine bubbles | — |
| Pot life, day | 22 | 14 | 1 | 24 | 10 | 22 | 20 | 10 | 1 | 0 |

Note: The composition of Comparative Example 3 was considerably sticky. The composition of Comparative Example 5 quickly scorched and its physical properties were unmeasurable.

There has been described a silicone rubber composition comprising components (A) to (D) which has a long pot life after addition of curing components (B) and (C) and is extrusion moldable into bubble-free transparent parts. The method of the invention ensures consistent preparation of the composition. Extrusion molded bubble-free parts will find application as medical parts as well as various tubes and gaskets.

Japanese Patent Application No. 5-345208 is incorporated herein by reference.

While this invention has been described with respect to a preferred embodiment, it will be understood by those skilled in the art that various changes and modifications may be made without departing from the spirit and scope of the invention.

We claim:

1. A method for preparing a silicone rubber composition which can be cured without foaming, said method comprising the steps of:

mixing and milling 100 parts by weight of (A) diorganopolysiloxane of the following average compositional formula (1):

$$R_1^1 SiO_{4-a)/2} \quad (1)$$

wherein $R^1$ is a substituted or unsubstituted monovalent hydrocarbon group, 0.01 to 15 mol % of the $R^1$ groups being an aliphatic unsaturated hydrocarbon group, and letter a is a positive number in the range of 1.95 to 2.05, and 5 to 200 parts by weight of (E) a reinforcing filler to form a base compound, and simultaneously mixing into the base compound (B) an organohydrogenpolysiloxane having at least two SiH groups in a molecule in such an amount that 0.5 to 10 mol of the SiH group is present per mol of the aliphatic unsaturated hydrocarbon group of component (A), a catalytic amount of (C) a platinum group metal catalyst, and 0.1 to 20 parts by weight of (D) an organic silicon compound of the following general formula (2):

$$(R^2O)_n-\underset{\underset{R^5}{|}}{\overset{\overset{R^3_{3-n}}{|}}{Si}}-\underset{\underset{}{|}}{\overset{\overset{R^4}{|}}{C}}-COOR^6 \quad (2)$$

wherein $R^2$, $R^5$, and $R^6$ are independently selected from substituted or unsubstituted monovalent hydrocarbon groups free of an aliphatic unsaturated bond, $R^3$ is a substituted or unsubstituted monovalent hydrocarbon group, $R^4$ is a hydrogen atom or methyl group, and letter n is an integer of 0 to 3.

2. The method of claim 1 further comprising adding 0.01 to 5 parts by weight of (F) a reaction control agent to the base compound with the platinum group metal catalyst (C).

3. The method of claim 1 wherein the diorganopolysiloxane of component (A) has a degree of polymerization of 2,000 to 10,000.

4. The method of claim 3, further comprising the step of curing the silicone rubber composition by hot air vulcanization without foaming.

5. A method of preparing a molded silicone rubber article comprising molding and curing a silicone rubber composition by hot air vulcanization wherein, said silicone rubber composition is prepared by the steps of:

mixing and milling 100 parts by weight of (A) diorganopolysiloxane of the following average compositional formula (1):

$$R_1^1 SiO_{4-a)/2} \quad (1)$$

wherein $R^1$ is a substituted or unsubstituted monovalent hydrocarbon group, 0.01 to 15 mol % of the $R^1$ groups being an aliphatic unsaturated hydrocarbon group, and letter a is a positive number in the range of 1.95 to 2.05, and 5 to 200 parts by weight of (E) a reinforcing filler to form a base compound, and simultaneously mixing into the base compound (B)

an organohydrogenpolysiloxane having at least two SiH groups in a molecule in such an amount that 0.5 to 10 mol of the SiH group is present per mol of the aliphatic unsaturated hydrocarbon group of component (A), a catalytic amount of (C) a platinum group metal catalyst, and 0.1 to 20 parts by weight of (D) an organic silicon compound of the following general formula (2):

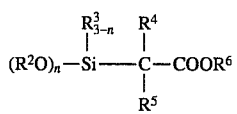 (2)
wherein $R^2$, $R^5$, and $R^6$ are independently selected from substituted or unsubstituted monovalent hydrocarbon groups free of an aliphatic unsaturated bond, $R^3$ is a substituted or unsubstituted monovalent hydrocarbon group, $R^4$ is a hydrogen atom or methyl group, and letter n is an integer of 0 to 3.
* * * * *